United States Patent [19]
Boegner et al.

[11] Patent Number: 5,457,958
[45] Date of Patent: Oct. 17, 1995

[54] METHOD AND APPARATUS FOR REDUCING NITROGEN OXIDES IN THE EXHAUST GAS OF AN INTERNAL COMBUSTION ENGINE

[75] Inventors: Walter Boegner, Remseck; Karl-Ernst Haak, Lichtenwald; Bernd Krutzsch, Denkendorf; Günter Wonninger, Stuttgart, all of Germany

[73] Assignee: Daimler-Benz AG, Stuttgart, Germany

[21] Appl. No.: 257,641

[22] Filed: Jun. 9, 1994

[30] Foreign Application Priority Data

Jun. 10, 1993 [DE] Germany .............. 43 19 294.7

[51] Int. Cl.6 ............................................. F02M 25/06
[52] U.S. Cl. ................................................ 60/279; 60/297
[58] Field of Search ............................ 60/278, 279, 297

[56] References Cited

U.S. PATENT DOCUMENTS 3,699,683 10/1972 Tourtellotte et al. .
5,085,049 2/1992 Rim ..................................... 60/279
5,125,231 6/1992 Patil .................................... 60/279
5,253,476 10/1993 Levendis ........................... 60/279

FOREIGN PATENT DOCUMENTS

| 0424966 | 5/1991 | European Pat. Off. . |
| 0460542 | 12/1991 | European Pat. Off. . |
| 62-174522 | 7/1987 | Japan . |
| 3135417 | 6/1991 | Japan . |

Primary Examiner—Douglas Hart
Attorney, Agent, or Firm—Klaus J. Bach

[57] ABSTRACT

In an apparatus for reducing the nitrogen oxide emission of an internal combustion engine wherein the nitrogen oxides are removed from the engine exhaust gas in an adsorber from which they are subsequently purged by hot gases, the hot gases with the nitrogen oxides purged from the adsorber are returned to the air intake of the internal combustion engine for reaction in the combustion process in the internal combustion engine in which the nitrogen oxide is converted to nitrogen and oxygen.

7 Claims, 1 Drawing Sheet

METHOD AND APPARATUS FOR REDUCING NITROGEN OXIDES IN THE EXHAUST GAS OF AN INTERNAL COMBUSTION ENGINE

BACKGROUND OF THE INVENTION

The invention relates to an apparatus for reducing the nitrogen oxides in the exhaust gas of an internal combustion engine by adsorption of the nitrogen oxides and their subsequent desorption and conversion to nitrogen and oxygen.

Such a method and apparatus are known from Japanese Patent Application 91-135417. As disclosed therein the exhaust gases emitted by the internal combustion engine are passed through an adsorbent in the exhaust manifold which contains a zeolite for the retention of the nitrogen oxides. Nitrogen oxides stored in the zeolite by adsorption are subsequently separated from the adsorption element by desorption with the aid of low-oxygen exhaust gas heated in a hot-gas generator and are fed to a reduction catalytic converter in which the nitrogen oxides react to form nitrogen and oxygen.

One disadvantage is that the internal combustion engine is restricted to a specific mode of operation by the reduction catalytic converter.

Another known method for the post-engine reduction of NOx is the SCR process (selective catalytic reduction) in which a reducing agent is required.

It is the principal object of the present invention to provide a method of reducing nitrogen oxides which does not require additional reducing agents and which can be used without restriction in the entire operating range of the internal combustion engine.

SUMMARY OF THE INVENTION

In an apparatus for reducing the nitrogen oxide emission of an internal combustion engine wherein the nitrogen oxides are removed from the engine exhaust gas in an adsorber from which they ape subsequently purged by hot gases, the hot gases with the nitrogen oxides purged from the adsorber are returned to the air intake of the internal combustion engine for reaction in the combustion process in the internal combustion engine in which the nitrogen oxide is converted to nitrogen and oxygen.

An essential feature of the method according to the invention is the return of the nitrogen oxides, which are first stored in the adsorber, to the intake air of the internal combustion engine. The nitrogen oxides, together with the intake air, in this way ape returned to and again subjected to the combustion process of the internal combustion engine. Since the nitrogen oxides ape thermodynamically unstable, they can react to form $N_2$ and $O_2$ under the reaction conditions prevalent in the combustion chamber. At the same time chemical reactions with carbon, carbon monoxide or hydrocarbons which likewise contribute to the reduction of the nitrogen oxides are also possible. An essential advantage of the method according to the invention is that the reduction of nitrogen oxides does not necessitate a reducing agent which has to be either generated on the vehicle or carried along in a separate container.

Various exemplary embodiments of the invention are explained in more detail in the following description of the invention on the basis of the drawings.

DESCRIPTION OF THE PREFERRED EMBODIMENTS

The method according to the invention for reducing the nitrogen oxides in the exhaust gas of an internal combustion engine comprises the following essential steps:

The exhaust gases emitted by the internal combustion engine are conducted through an adsorber where the nitrogen oxides are adsorbed by the adsorbent. Materials which would be suitable as adsorbents are compounds, such as perovskites, e.g., $LaCoO_3$, which can selectively adsorb large quantities of nitrogen oxides.

As soon as the adsorbent has reached its storage capacity, the nitrogen oxides are separated from the adsorbent by desorption with the aid of a hot gas and are admixed to the intake air of the internal combustion engine.

The nitrogen oxides are conducted, together with the intake air, into the combustion chambers of the internal combustion engine where they react to form $N_2$ and $O_2$ because of the prevailing reaction conditions.

Figure 1:
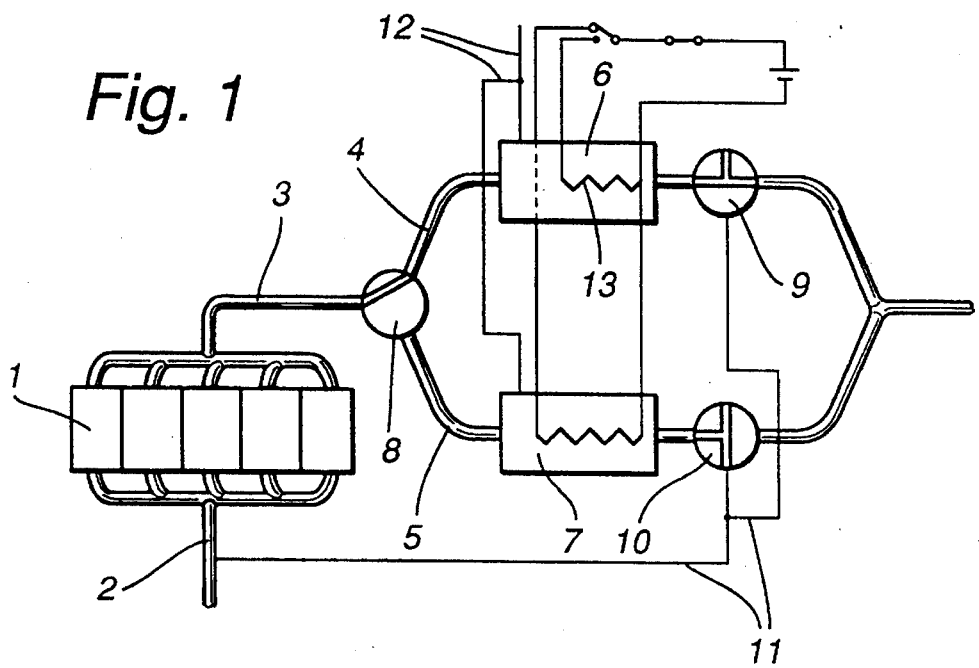
FIG. 1 is a schematic representation of an apparatus for implementing the method according to the invention wherein two in adsorbers are arranged parallel in an exhaust system as used preferably with a diesel-type internal combustion engine.

FIG. 1 shows an apparatus which is particularly suitable for implementing the method in a diesel-type internal combustion engine.

Reference numeral 1 designates a multicylinder diesel-type internal combustion engine which has an intake manifold 2 and an exhaust manifold 3. The exhaust manifold 3 is divided into two parallel exhaust conduit branches 4 and 5 in which nitrogen oxide adsorbers 6 and 7, respectively, are arranged. In order that the two adsorbers 6 and 7 may be operated alternately, a control valve 8 is provided upstream in the branch between the exhaust manifold 3 and manifold branches 4 and 5. Downstream from the adsorbers 6 and 7, return valves 9 and 10, respectively, are arranged in the conduit branches 4 and 5, by which, selectively, communication can be established with a return line 11 connected to the intake manifold 2. In addition, an air pipe 12 is connected to each adsorber 6, 7, and each adsorber further includes a heating device 13, which can be electrically operated. The air pipe 12 and heating device 13 are used for the desorption of the nitrogen oxides from the adsorbers 6, 7. As shown in FIG. 1 the adsorber 6 is in communication with the exhaust manifold 3 by the setting of control valve 8. The exhaust gas discharged from the internal combustion engine 1 passes through the adsorber 6, which is equipped with an adsorbent material, e.g., $LaCoO_3$, by which nitrogen oxides in the exhaust gas are adsorbed. The return valve 9 is in the flow discharge position in which the exhaust gas passes into the continuing exhaust conduit branch 4. The heating device 13 is not energized in this adsorption stage. Also, no air is fed through the air feed pipe 12 to the adsorber 6. While the adsorber 6 operates in the adsorption mode, the adsorber 7 operates in the desorption mode in which the nitrogen oxides are removed from the adsorbent material. This is done by feeding air through the air pipe 12 and heating the air by means of the heating device 13 in the adsorber 7 which is energized. The nitrogen oxides are returned together with the hot gas formed in this way via the return valve 10, which is set to provide flow connection with the return line 11, to the intake manifold 2 and thereby to the combustion chambers of the internal combustion chamber 1 in which the nitrogen oxides react to form nitrogen and oxygen.

When the adsorber 7 has been regenerated, the position of the control valve 8 is reversed so as to cause the adsorber 7 to switch to the adsorption mode, At the same time the adsorber 6 is switched to the desorption mode in which the heating device 6 is energized and air is supplied through the air feed pipe 12, whereby the nitrogen oxides are removed from the adsorption material as previously described with respect to the adsorber 7 and again the nitrogen oxides are supplied to the intake manifold 2 via the return line 11 under the control of the return valve 9 which is then in the position shown for valve 10.

Figure 2:
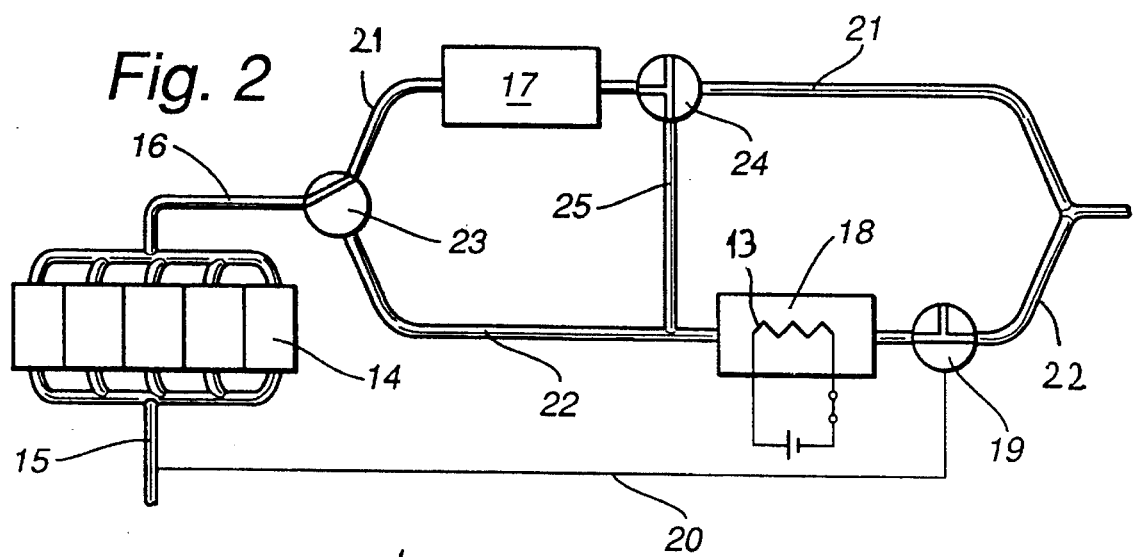
FIG. 2 is a schematic representation of an apparatus according to the invention particularly for a spark ignition, that is, gasoline, type internal combustion engine utilizing an adsorber and a three-way catalytic converter.
Figure 3:
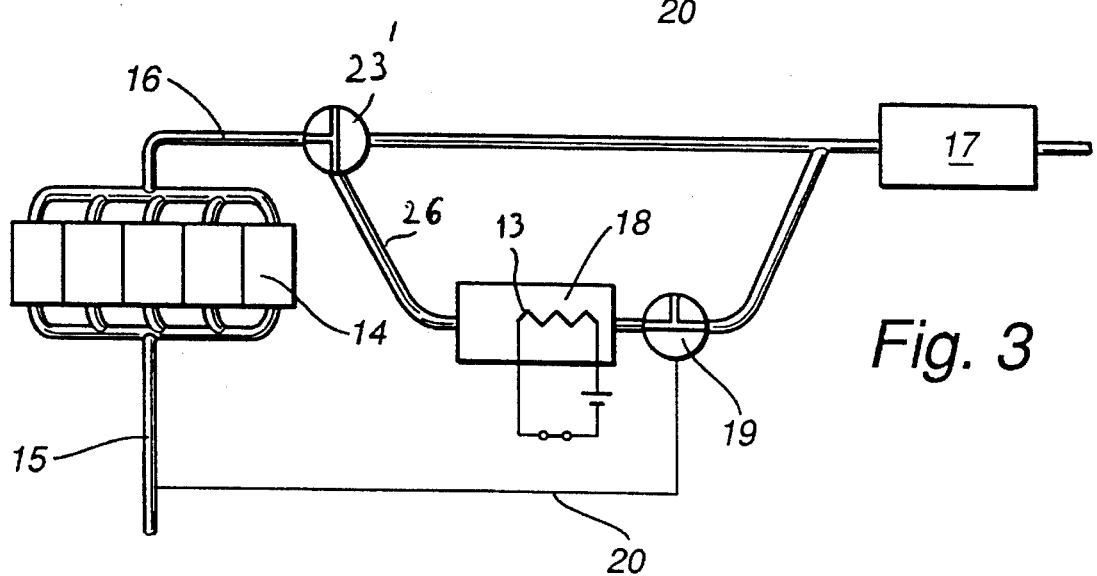
FIG. 3 shows a simplified embodiment of the apparatus of FIG. 2.

FIGS. 2 and 3 each show an apparatus for the method according to the invention which is suitable particularly for reducing the nitrogen oxides in the exhaust gas of gasoline-type internal combustion engines.

The gasoline-type internal combustion engine is designated by reference numeral 14 and has an intake manifold 15 and also an exhaust manifold 16 leading to an exhaust conduit 21. Situated in the exhaust conduit 21 is a three-way catalytic converter 17 and an adsorber 18 for the adsorption of the nitrogen oxides contained in the exhaust gas which is disposed in a conduit 22 (FIG. 2) or a conduit 26 (FIG. 3). The adsorber 18 is followed in each case by a return valve 19 from which a return line 20 leads, and is connected, to the intake manifold 15.

According to FIG. 2, the exhaust manifold 16 divides into two parallel exhaust conduit branches 21 and 22, the three-way catalytic converter 17 being arranged in the conduit branch 21 and the adsorber 18 and return valve 19 in the conduit branch 22. By means of a control valve 23 the exhaust gas can be directed from the exhaust manifold 16 into the exhaust conduit branches 21 or 22. In addition, the exhaust conduit branch 21 contains, downstream from the three-way catalytic converter 17, a reverse valve 24, from which a connecting line 25 extends to the exhaust conduit branch 22 and is connected thereto upstream from the adsorber 18.

In FIG. 2 the arrangement is shown in the adsorption mode. The exhaust gases discharged by the internal combustion engine pass via the control valve 23 into the exhaust conduit branch 21 and through the three-way catalytic converter 17. In order to achieve optimum treatment of the pollutants, the internal combustion engine is operated at an air ratio of $\lambda=1$ or $>1$. The reverse valve 24 is set to direct the exhaust gas through the connecting line 25 into the exhaust conduit branch 22 whereby the exhaust gas is conducted through the adsorber 18 and is then discharged into the atmosphere via the return valve 19. In the adsorber 18 the nitrogen oxides contained in the exhaust gas are adsorbed by the adsorption material contained there,no As soon as the adsorber 18 reaches its saturation limit, the arrangement is switched to the desorption mode:

The reverse valve 24 is switched to the open position in which the exhaust gases leaving the catalytic converter are directly discharged without following through the adsorber 18. The return valve 19 is switched in such a manner that the flow of exhaust gases through the exhaust manifold branch 22 is blocked and the return line 20 is connected to the adsorber 18.

Because the adsorber 18 is not utilized in the desorption mode, the internal combustion engine is operated at an air ratio of $\lambda=1$ or $<1$ to avoid excessive formation of nitrogen oxides. Unlike in the exemplary embodiment of FIG. 1, part of the stream of exhaust gases is used instead of air in the arrangement according to FIG. 2 to regenerate the adsorber 18. For this purpose, the control valve 23 is designed in such a manner that in one of the possible switch positions a partial quantity of approximately 5% of the exhaust gases is fed into the exhaust manifold branch 22, while the main exhaust gas stream of 95% is directed into the exhaust conduit branch 21 with the catalytic converter 17. This makes it possible to eliminate the need for a special air feed pipe. Should the temperature of the partial quantity of exhaust gases be insufficient to regenerate the adsorbent, the heating device 13 which is also provided in the adsorber 18 can be energized. The nitrogen oxides which are removed from the adsorber 18 and enter the partial stream of exhaust gas during the desorption phase are returned via the return valve 19 and the return line 20 to the intake manifold 15, when they are mixed with the intake air and are fed back to the combustion chambers of the internal combustion engine 14 where, as already described, they react to form nitrogen and oxygen.

The arrangement of FIG. 3 differs from that of FIG. 2 in that the adsorber 18 is arranged in a bypass 26 which forms a branch conduit from the exhaust conduit upstream from the catalytic converter 17. This arrangement is suitable particularly for an internal combustion engine 14 with lean-mixture operation at an air ratio of $\lambda>1$. FIG. 3 shows the arrangement for the adsorption mode. The control valve 23' and the return valve are positioned in such a way that the exhaust gases are fed first to the adsorber 18 and only then to the catalytic converter 17. In the adsorber 18 the nitrogen oxides are adsorbed onto the adsorption material so that exhaust gas containing no nitrogen oxides or scarcely any nitrogen oxides flows to the catalytic converter 17.

When the storage capacity of the adsorber 18 has been reached, a switch-over to the desorption mode takes place, wherein the exhaust gases of the internal combustion engine 14 are fed directly to the catalytic converter 17. At the same time the internal combustion engine is switched from lean-mixture operation to stochiometric operation in order to reduce the proportion of nitrogen oxides in the exhaust gas. Further operation corresponds to the desorption process described with regard to FIG. 2. After the adsorbent has been regenerated, a switch-back to the adsorption mode takes place.

Within the scope of the invention it is obviously also conceivable for hot air to be used for the desorption instead of exhaust gas in the exemplary embodiments of FIGS. 2 and 3, and also for hot exhaust gas to be used instead of hot air in the apparatus of FIG. 1. The hot exhaust gas for the desorption procedure may also be taken from the exhaust conduit downstream of the catalytic converter, rather than directly from the engine exhaust manifold.

What is claimed is:

1. An apparatus for reducing the nitrogen content in the exhaust gas of an internal combustion engine having an intake manifold for supplying intake air to said engine, an exhaust system for receiving the exhaust gases from said engine, said exhaust system including two parallel exhaust conduit branches, each having an adsorber arranged therein, a control valve disposed in said exhaust system upstream of said adsorbers and capable of directing the flow of exhaust gas from said engine through either one of said exhaust conduit branches, a return valve arranged in each branch conduit downstream of each adsorber, a return line extending between each return valve and said air intake manifold, said return valve in each exhaust gas branch conduit being capable of permitting the gas flow from the respective adsorber to be discharged through said exhaust gas conduit or directing it through said return line and said intake manifold back into the internal combustion engine and an air feed pipe connected to each of said adsorbers for supplying air thereto for the removal of nitrogen oxides retained in said adsorbers during a desorption procedure in which said return valve is directing the air flow from the respective adsorber back to the internal combustion engine.

2. An apparatus according to claim 1, wherein electric heating means are provided for enhancing desorption in said adsorbers.

3. An apparatus for reducing the nitrogen content in the exhaust gas of an internal combustion engine having an intake manifold for supplying intake air to said engine, an exhaust conduit for receiving the exhaust gases from said engine, said exhaust conduit including an exhaust gas branch conduit with an adsorber for removing nitrogen oxides from the exhaust gases directed through said branch conduit and a bypass conduit for directly discharging said exhaust gases, said exhaust gas conduit also including a three-way catalytic converter, a control valve arranged in said exhaust gas conduit capable of alternatively directing the exhaust gas from the engine through the conduit branch which includes the adsorber or to direct it to be discharged directly through said by-pass conduit whereby the exhaust gas then flows only through said catalytic converter, a return valve arranged in said exhaust gas branch conduit downstream of said adsorber and return line extending between said return valve and said air intake manifold, said return valve being capable of permitting gas flow from said adsorber to be discharged through said exhaust gas conduit or to direct it through said return line and said intake manifold back into the internal combustion engine.

4. An apparatus according to claim 3, wherein electric heating means are provided for enhancing desorption in said adsorbers.

5. An apparatus according to claim 3, wherein an air feed pipe is connected to said adsorber for supplying thereto for the removal of nitrogen oxides retained in said adsorber during a desorption procedure in which said return valve is directing the air flow from the adsorber back to the internal combustion engine.

6. An apparatus according to claim 3, wherein said catalytic converter is arranged in said exhaust gas conduit down stream of said branch conduit which includes the adsorber.

7. An apparatus according to claim 3, wherein said catalytic converter is arranged in said exhaust gas conduit upstream of said control valve such that exhaust gas directed to said adsorber is first passed through said catalytic converter.

* * * * *